H. SARGESON.
BORING AND MILLING TOOL.
APPLICATION FILED NOV. 21, 1919.

1,385,052. Patented July 19, 1921.
2 SHEETS—SHEET 1.

Inventor:
Harry Sargeson,

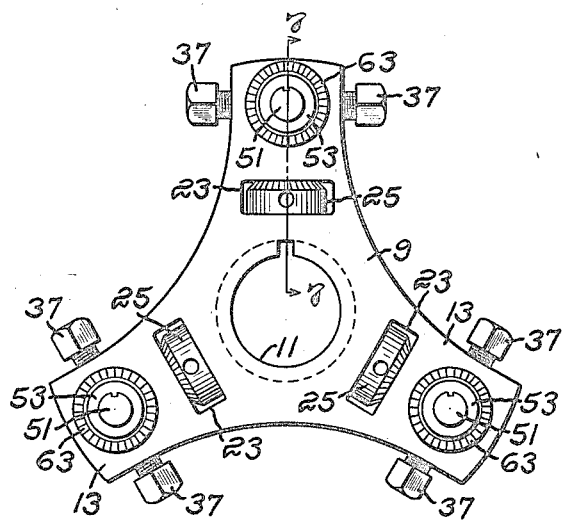
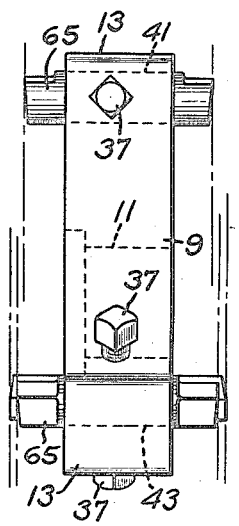
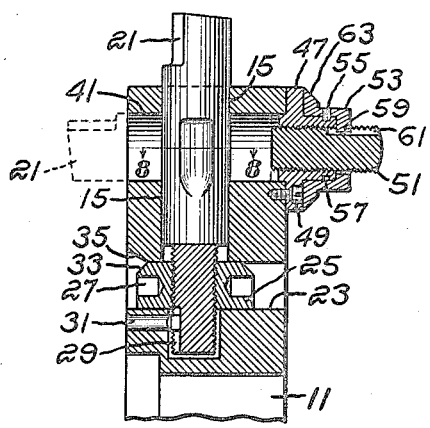

UNITED STATES PATENT OFFICE.

HARRY SARGESON, OF BEVERLY, MASSACHUSETTS.

BORING AND MILLING TOOL.

1,385,052. Specification of Letters Patent. Patented July 19, 1921.

Application filed November 21, 1919. Serial No. 339,667.

*To all whom it may concern:*

Be it known that I, HARRY SARGESON, a citizen of the United States, and a resident of Beverly, in the county of Essex and State of Massachusetts, have invented an Improvement in Boring and Milling Tools, of which the following description, in connection with the accompanying drawings, is a specification, like characters on the drawings representing like parts.

This invention relates to boring and milling tools and the purpose is to provide a device of this character permitting rapid and accurate execution of the work.

My invention will be best understood by reference to the following description of one particular embodiment thereof such as that which is shown by way of example in the accompanying drawings illustrating a tool adapted to operate with three cutters. In these drawings—

Fig. 5 is an end elevation from the side opposite that shown in Fig. 3;

Fig. 6 is a side elevation showing different cutters adapted for slotting;

Fig. 7 is a section on the line 7—7 of Fig. 5 and is on an enlarged scale; and

Fig. 8 is a section on the line 8—8 of Fig. 7.

In the embodiment of my invention chosen for purposes of illustration a tool is illustrated which utilizes three cutters and which is arranged to cut progressively or incrementally during one and the same operation, although other designs of the tool utilizing different numbers of blades may be used. The construction here shown (see Figs. 1 and 2) comprises a tool body or stock 9 having the central opening 11 provided with keyway 12 whereby it may be secured on a suitable power rotated shaft, for example, that on a suitable machine tool, the stock herein taking the form of a spider having three radiating arms 13.

Figure 1:
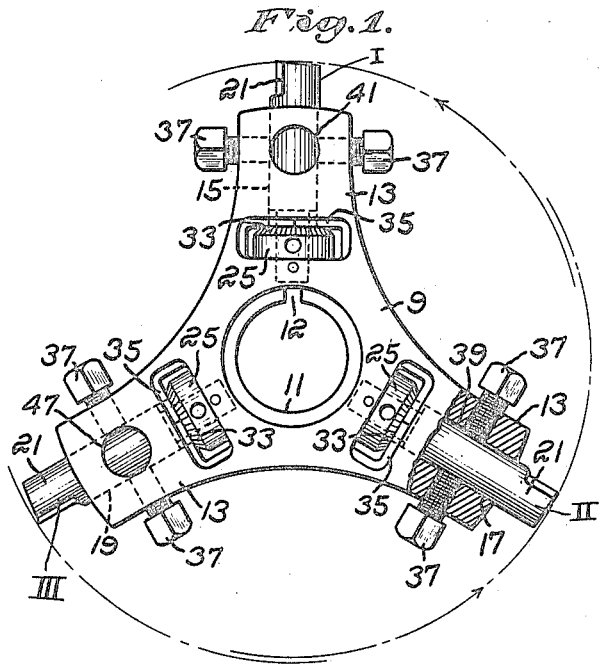
Figure 1 is an end elevation partly broken away of the tool utilizing radial cutters.
Figure 2:
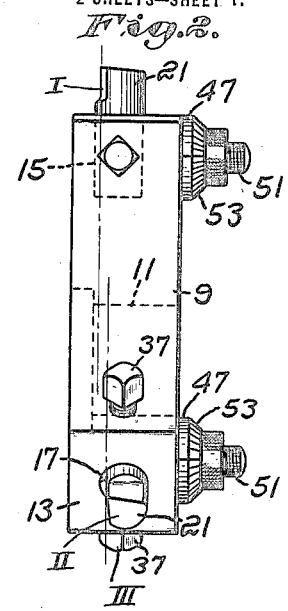
Fig. 2 is a side elevation thereof.

In Figs. 1 and 2 showing an arrangement adapted for boring the arms 13 are provided with radial openings 15, 17 and 19 to receive the cutters 21, the cutters herein being distinguished by the numbers I, II and III.

The openings 15, 17 and 19 are not all in the same plane but are disposed progressively farther away from the face of the stock, that is, from the left hand side in Fig. 2, as is indicated by the lines in that figure drawn along the cutting edges of cutters I and II. The cutters are adapted to be adjusted to lie at different radial distances from the center of the stock and, as indicated by the arcs in Fig. 1, the cutter I which is nearer the face of the stock sweeps through a smaller arc than the cutter II and the latter in turn through an arc smaller than the arc in cutter III. Thus as the tool advances to the left in Fig. 2 while rotating the cutter I makes the first cut and as it enters farther into the work and during the same revolution of the head the cutter II will make a further cut at the same place of greater circumference and this cut will be again enlarged by the cutter III. The opening of the ultimate radius determined by the position of cutter III is thus gradually made, permitting a cut of relatively great size to be rapidly made in a single operation. Otherwise described, it might be said that the cutting edges of the plurality of tools form a series disposed along a helix and come into operation successively as the tool rotates and as it is advanced axially.

Any suitable means may be employed for positioning the cutters I, II and III but conveniently they are made adjustable and the adjusting means may have a zero or initial position providing for the differential placing of the tools in proper relation as described so that for a given nominal position of adjustment they will always make cuts of progressively differing radius. The adjusting means herein shown for purposes of illustration may perhaps be best understood by reference to Fig. 7. As there shown the body or stock may be provided with transverse slots 23 intersecting the cutter receiving openings as 15 and each slot is adapted to snugly receive an adjusting nut 25 which may be provided with openings 27 to receive a suitable operating tool. Coöperating with the adjusting nut is a screw 29 adapted to bear on the end of the cutter 21 as shown and to cause this screw to advance and move the cutter on rotation of nut 25 it may be keyed in the socket as by means of the pin 31 entering a slot in the side thereof. The nut 25 may be coned off to provide a beveled surface 33 adapted to meet the beveled side 35 of the slot and one of these beveled faces, as the surface 33, may be provided with suitable graduations as indicated in Fig. 1 coöperating with an index or zero point on the beveled surface 35. The zero points of the several adjusting means are preferably so arranged that they will cause a uniform difference in the radial positions of successive cutters. Coöperating with the adjusting mechanism shown there may be provided (see Fig. 1) one or more set screws 37 entering laterally through the arms of the stock to the cutter receiving opening. I have herein shown two screws, the construction providing for their introduction from either side. In practice it is desirable to use but one, that being on the leading side considering the direction of rotation, the side of the cutter-receiving opening providing a long bearing against which the screw may press the cutter. As shown at the broken away portion of the right hand side of Fig. 1 the cutters are preferably provided with sloping surfaces 39 flaring inwardly toward the center of the stock and on which the ends of the set screws bear, thus to provide a resultant force tending to hold the cutters against the end of adjusting screws 29. Preferably as indicated in Fig. 8 this face is somewhat concaved, twisting movement of the cutter being thus avoided.

Figure 3:
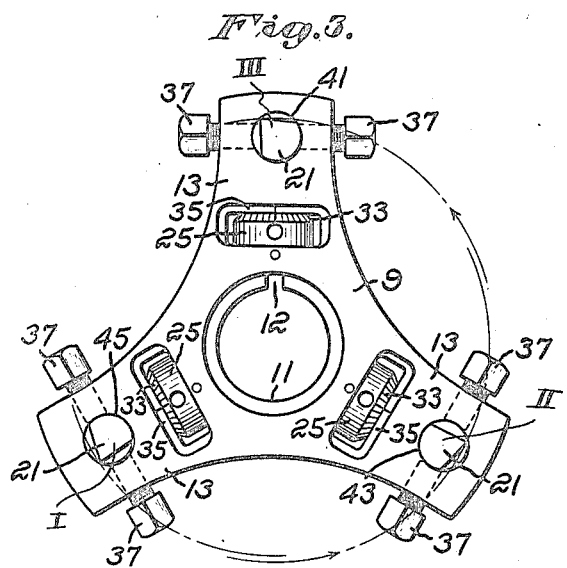
Fig. 3 is an end elevation of the tool utilizing cutters extending parallel with the axis of rotation.
Figure 4:
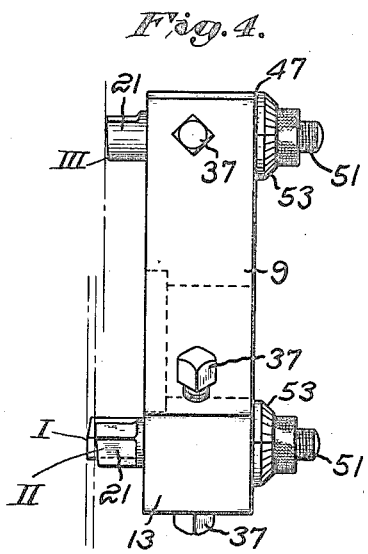
Fig. 4 is a side view thereof.

The tool herein shown is adapted to operate both with radially disposed cutters and with cutters disposed parallel to the axis of rotation and which for convenience I will here refer to as axial cutters. The latter arrangement adapted particularly for surface milling is shown in Figs. 3, 4 and 5. For this purpose the stock is provided with transverse openings 41, 43 and 45 parallel to the axis of rotation and conveniently intersecting the openings 15, 17 and 19 respectively. These openings are adapted to receive cutting tools 21 in the manner indicated in Fig. 4, these tools being designated I, II and III as before. The openings 41, 43 and 45 are located at varying distances from the axis of rotation, the opening 41 herein being at the greatest distance, 43 at a lesser distance and 45 at a still less distance as indicated by the arcs in Fig. 3. The stock is adapted to be rotated in a counterclockwise direction, viewing Fig. 3, and the cutters are adapted to be adjusted to project varying distances from the face of the stock. In the present instance the cutter which makes the cut of smallest radius is adapted to make the first cut, this being tool I (see Fig. 4). The cutter II projects a lesser distance from the face of the stock and cutter III the smallest distance. The cutting edges are thus disposed along the spire of the helix, the diameter of which in this instance is smaller than the diameter of the stock and which is in advance of the face of the stock.

Suitable adjusting means, such as that illustrated for example in Fig. 7, may be utilized for positioning the cutters 21 in the openings 41, 43 and 45. In Fig. 7 there is shown a nut 47 alined with the opening 41 and having a flange secured to the rear face of the stock as by means of screws 49, one of which appears in the figure. Coöperating with this nut is an adjusting screw 51 adapted to bear against the tool 21 shown in dotted lines. For operating this nut I have herein shown a member 53 rotatably mounted on the nut as by means of the headless screw 55 entering an annular slot 57 herein, this member being keyed to the screw 51 by the feather 59 entering slot 61 therein. Rotation of the member will thus advance the screw in the fixed nut. The operating member may be provided with the coned flange 63 provided with graduations as shown in Fig. 4 adapted to coöperate with an index or zero on the flange of the nut. As before the zero indications are preferably adapted to position the several cutters in relatively varying positions of adjustment.

The set screws 37 may serve to clamp the cutter when in the dotted line position in Fig. 7 as well as when in the full line position in that figure. For this purpose they may enter laterally of the arms 13 to the point of intersection of the radial and axial openings as shown.

It will be noted that the adjusting means for the axial cutters shown in Fig. 7 is bodily removable from the stock by removal of the screws 49. This permits the use of double ended tools as shown in Fig. 6 to provide a straddle tool. The cutters 65 shown in Fig. 6 are provided with cutting edges at each end and the cutter which is disposed in opening 41 farthest from the center of rotation is relatively short. The cutter in opening 43 as indicated by the lines in Fig. 6 projects a distance beyond the cutter in opening 41 at either side and the cutter in opening 45 projects a still farther distance. Thus the cutter which makes the first cut and strikes deepest is making the narrowest cut which is gradually being enlarged by the other cutters. The set screws 37 will serve to clamp cutting tools 65 in the same way as the cutting tools 21 are clamped in the openings 41, 43 and 45.

In the tool described whether used for boring, as in Figs. 1 and 2, or for face milling, as in Figs. 3 and 4, acts on each revolution to give an incremental cut. Thus one tool acts first, removing a comparatively small portion of the material acted upon with corespondingly small resistance and the cut made by this first tool is immediately widened by the succeeding tool and so on, the effect in one revolution being of a relatively broad cut, removing a comparatively large amount of the material. This incremental action permits of high speed and has other advantages. For example, in face milling the pressure need not be excessive such as might be apt to spring the work, a condition sometimes encountered in working, for example, on cast iron. On the contrary, the pressure is comparatively light and is distributed and the material is removed without difficulty by the successive action of the various tools, each increasing the area of cut and gradually removing the desired fitness of material.

I have thus described in detail the form of my invenion herein shown wherein it is intended to utilize a plurality of cutters herein by way of example three and wherein they may be manipulated to cut successively in a single operation. The principles which are exemplified I shall define in the following claims.

Claims:

1. A tool of the class described comprising a rotatable stock having radial cutter-receiving sockets disposed at successively increasing distances from the face thereof and axial cutter-receiving sockets disposed at successively increasing distances from the center thereof, and means for supporting cutters in the first with provision for radial adjustment and in the second with provision for axial adjustment.

2. A tool of the class described comprising a rotatable stock having a series of radial sockets, intersecting sockets parallel to the axis of rotation and disposed at successively varying distances therefrom and a means for clamping a cutter in either of the intersecting sockets.

3. A tool of the class described comprising a rotatable stock having a series of radial sockets disposed at successively greater distances from the face thereof, intersecting sockets parallel to the axis of rotation and disposed at successively varying distances therefrom and a means for clamping a cutter in either of the intersecting sockets.

4. A tool of the class described comprising a rotatable stock having radial cutter-receiving sockets disposed at successively increasing distances from the face thereof and means for adjusting the cutters radially in the sockets providing initial or zero positions thereof successively more distant from the center.

5. A tool of the class described comprising a rotatable stock having axial cutter-receiving sockets disposed at successively varying distances from the center thereof and means for adjusting the cutters axially in the sockets providing initial or zero positions at successively decreasing distances from the face of the stock.

6. A tool of the class described comprising a stock having a socket, a cutter received therein, said stock having a slot intersecting the socket, a nut received by the slot, a coöperating screw keyed in said socket and adapted to bear on the cutter.

7. A tool of the class described comprising a stock having a socket, a cutter received therein, said stock having a slot intersecting the socket and having a beveled face, a nut received by the slot having a beveled face meeting the first, coöperating graduations on said faces, a nut received by the slot, a coöperating screw keyed in said socket and adapted to bear on the cutter.

8. A tool of the class described comprising a rotatable stock having a transverse opening providing a cutter-receiving socket, a nut alined with the opening and detachably secured to said stock and an adjusting screw in the nut adapted to bear on the cutter, the whole being thus removable to permit the use of a double ended tool.

9. A tool of the class described comprising a rotatable stock having a transverse opening providing a cutter-receiving socket, a nut alined with the opening and detachably secured to said stock, a screw in said nut adapted to bear on the cutter, and a member rotatably mounted on the nut and keyed to the screw.

10. A tool of the class described comprising a stock having a socket, a cutter received thereby, means at the inner end of the socket for moving the cutter therein, a set screw entering laterally to said socket and having an engagement with the cutter developing an inward force.

11. A tool of the class described comprising a stock having a socket, a cutter received thereby, means at the inner end of the socket for moving the cutter therein and a set screw entering laterally to said socket, said cutter having an outwardly tapered surface against which the screw bears.

12. A tool as described in claim 11 wherein said face is concaved.

In testimony whereof, I have signed my name to this specification.

HARRY SARGESON.